United States Patent
Cazares et al.

(10) Patent No.: US 10,958,031 B1
(45) Date of Patent: Mar. 23, 2021

(54) TERMINAL UN-SEATED TESTER FOR SMART KITTING OF WIRED CONNECTORS

(71) Applicant: Aptiv Technologies Limited, St. Michael (BB)

(72) Inventors: Isaac Cazares, Juarez (MX); Juan Ortiz, Juarez (MX)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 0 days.

(21) Appl. No.: 16/750,461

(22) Filed: Jan. 23, 2020

(51) Int. Cl.
*H01R 43/24* (2006.01)
*G05B 19/048* (2006.01)
*B23Q 7/14* (2006.01)

(52) U.S. Cl.
CPC .......... *H01R 43/24* (2013.01); *G05B 19/048* (2013.01); *B23Q 7/1426* (2013.01)

(58) Field of Classification Search
CPC ..... H01R 43/24; G05B 19/048; B23Q 7/1426
See application file for complete search history.

(56) References Cited

U.S. PATENT DOCUMENTS

| | | | | |
|---|---|---|---|---|
| 3,627,300 A | * | 12/1971 | Caveney | F16L 3/1066 269/131 |
| 4,433,479 A | * | 2/1984 | Suzuki | H02G 1/1248 29/825 |
| 4,566,502 A | | 1/1986 | Kellogg | |
| 4,704,775 A | * | 11/1987 | Cross | H01R 43/28 248/68.1 |
| 5,829,130 A | * | 11/1998 | Miller | A47B 88/90 29/868 |
| 6,003,852 A | * | 12/1999 | Kawamura | H01B 13/01209 269/287 |
| 6,463,849 B2 | * | 10/2002 | Mizutani | H01R 43/28 100/35 |
| 8,900,000 B2 | * | 12/2014 | Cairns | H01R 13/523 439/135 |

FOREIGN PATENT DOCUMENTS

| | | |
|---|---|---|
| CN | 206096330 U | 4/2017 |
| JP | 2011119065 A | 6/2011 |
| KR | 2020090004123 U | 5/2009 |
| WO | 2015156793 A1 | 10/2015 |

* cited by examiner

*Primary Examiner* — Jean F Duverne
(74) *Attorney, Agent, or Firm* — RMCK Law Group, PLC

(57) ABSTRACT

Wired connector assembly systems and methods involve fixing a connector in an assembly station and following, by an assembler, a set of instructions indicating a set of wires and a respective set of terminal portions of the connector in which the set of wires are to be seated. A controller of the assembly station then monitors a pulling force on the connector via each seated wire to verify proper wire-terminal portion seating. After completing the set of instructions, including verifying each proper wire-terminal portion seating, the connector is released from the assembly station and a fully assembled wired connector is obtained.

20 Claims, 7 Drawing Sheets

TERMINAL UN-SEATED TESTER FOR SMART KITTING OF WIRED CONNECTORS

FIELD

The present disclosure generally relates to wired connector assemblies and, more particularly, to systems and methods for assisting an assembler in the assembly of wired connectors.

BACKGROUND

Wired connectors typically comprise a connector defining a plurality of terminal portions where a plurality of respective wires are seated (i.e., physically secured to create an electrical connection). During assembly of wired connectors, an assembler typically employs a "push-click-tug" procedure where each wire is inserted by the assembler into its respective terminal portion until a click indication is observed. After observing this click indication, the assembler then tugs on the wire to ensure it can withstand a certain tension or pulling force. This assembly process typically involves the assembler following a printed diagram or some other static instruction display, which is prone to assembler misinterpretation, particularly for less experienced users. In addition, there is a large amount of variability in the tension or pulling force applied by each assembler during the tug portion of the push-click-tug method, which could result in wires that are improperly seated in the connector. As a result, a large number of wired connectors do not pass testing, leading to decreased first time quality (FTQ) metrics and increased costs to fix improperly assembled wired connectors. Accordingly, while these conventional assembly systems and methods work well for their intended purpose, an opportunity exists for improvement in the relevant art.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

According to one aspect of the present disclosure, an assembly station of an assembly system for assisting an assembler in the assembly of a connector and a set of wires seated in a set of terminal portions of the connector, respectively, is presented. In one exemplary implementation, the assembly station comprises a base member, a latching system attached to the base member, defining a receptacle, and being configured to move between a closed position in which the connector is fixed within the receptacle and an open position in which the connector is removable from the receptacle, a sensor system attached to the base member and being configured to sense a pulling force on the connector while fixed within the receptacle of the latching system, at least a portion of a guide system configured to output instructions, and a controller configured to command the guide system to sequentially output a set of instructions instructing the assembler how to properly seat the set of wires in the set of terminal portions of the connector, during the output of each particular instruction of the set of instructions, monitor, using the sensor system, the sensed pulling force on the connector, in response to the sensed pulling force satisfying a first threshold indicative of a proper wire-terminal portion seating, command the guide system to complete the output of the particular instruction and to then sequentially output any remaining instructions of the set of instructions until the output of a final instruction is complete, including the sensed pulling force again satisfying the first threshold, and a wired connector is thereby obtained.

In some implementations, the controller is configured to, in response to the sensed pulling force exceeding a greater second threshold indicative of a pulling force that could damage the connector, command the latching system to the open position thereby freeing the connector from the receptacle. In some implementations, each instruction of the set of instructions comprises a respective set of visual outputs, and wherein each visual output of the respective set of visual outputs identifies either a particular wire of the set of wires or a particular terminal portion of the connector in which the assembler is to seat the particular wire. In some implementations, the base member defines an opening aligned with the receptacle, wherein the guide system comprises a display device attached to a first side of the base member that opposes a second side of the base member where the latching system and the sensing system are attached, and wherein the display device is aligned with the opening. In some implementations, the display device is configured to output at least some of each respective set of visual outputs through the opening defined by the base member to thereby identify the particular terminal portion of the connector in which the assembler is to seat the particular wire. In some implementations, the guide system further comprises a visual indicator system that is distinct from the assembly station and its display device and that is configured to output at least some of each respective set of visual outputs proximate to a particular container of a set of respective containers that store the set of wires to identify the particular container from which the assembler is to retrieve the particular wire.

In some implementations, the latching system is pneumatically-actuated latch comprising two latching members each movable along an axis and being configured to move inwardly along the axis to fixably contact the connector in the closed position and to move outwardly along the axis to not contact the connector in the open position.

In some implementations, the sensor system comprises at least one pair of force sensors attached to the base member, wherein a first force sensor of each pair of force sensors is attached to the base member proximate to a diagonally opposing corner of the receptacle relative to a second force sensor of the pair of force sensor.

In some implementations the assembly station further comprises a manual release switch that, when actuated, moves the latching system to the open position.

In some implementations, the controller is a programmable logic controller (PLC) and the first and second thresholds are calibratable during a calibration process that utilizes an external handheld tensiometer.

According to another aspect of the present disclosure, an assembly method using an assembly station of an assembly system to assist an assembler in assembling a connector and a set of wires seated in a set of terminal portions of the connector, respectively, is presented. In one exemplary implementation, the assembly method comprises detecting, by a controller of the assembly station, that the connector is fixed by and within a receptacle defined by a latching system of the assembly station, wherein the latching system is attached to a base member of the assembly station and is configured to move between a closed position in which the connector is fixed within the receptacle and an open position in which the connector is removable from the receptacle, in response to detecting that the connector is fixed within the receptacle, commanding, by the controller, a guide system of the assembly system to sequentially output a set of instructions instructing the assembler how to properly seat the set of wires in the set of terminal portions of the connector, during the output of each particular instruction of the set of instructions, monitoring, by the controller and using a sensor system of the assembly station, a sensed pulling force on the connector, wherein the sensor system is also attached to the base member, and in response to the sensed pulling force satisfying a first threshold indicative of a proper wire-terminal portion seating, commanding, by the controller, the guide system to complete the output of the particular instruction and to then sequentially output any remaining instructions of the set of instructions until the output of a final instruction is complete, including the sensed pulling force again satisfying the first threshold, and a wired connector is thereby obtained.

In some implementations, the method further comprises in response to the sensed pulling force exceeding a greater second threshold indicative of a pulling force that could damage the connector, commanding, by the controller, the latching system to the open position thereby freeing the connector from the receptacle. In some implementations, each visual instruction of the set of visual instructions comprises a respective set of visual outputs, and wherein each visual output of the respective set of visual outputs identifies either a particular wire of the set of wires or a particular terminal portion of the connector in which the assembler is to seat the particular wire. In some implementations, the base member defines an opening aligned with the receptacle, wherein the guide system comprises a display device attached to a first side of the base member that opposes a second side of the base member where the latching system and the sensing system are attached, and wherein the display device is aligned with the opening. In some implementations, the display device is configured to output at least some of each respective set of visual outputs through the opening defined by the base member to thereby identify the particular terminal portion of the connector in which the assembler is to seat the particular wire. In some implementations, the guide system further comprises a visual indicator system that is distinct from the assembly station and its display device and that is configured to output at least some of each respective set of visual outputs proximate to a particular container of a set of respective containers that store the set of wires to identify the particular container from which the assembler is to retrieve the particular wire.

In some implementations, the latching system is a pneumatically-actuated latch comprising two latching members each movable along an axis and being configured to move inwardly along the axis to fixably contact the connector in the closed position and to move outwardly along the axis to not contact the connector in the open position, and wherein the assembly station further comprises a manual release switch that, when actuated, moves the latching system to the open position.

In some implementations, the sensor system comprises at least one pair of force sensors attached to the base member, wherein a first force sensor of each pair of force sensors is attached to the base member proximate to a diagonally opposing corner of the receptacle relative to a second force sensor of the pair of force sensors.

In some implementations, the controller is a PLC and the method further comprises calibrating, by the controller, the first and second thresholds are during a calibration process that utilizes an external handheld tensiometer.

According to yet another aspect of the present disclosure, a method for a user to assemble a wired connector is presented. In one exemplary implementation, the method comprises obtaining a set of wires for the wired connector, each wire of the set of wires being stored in a respective container of a set of containers, obtaining a connector for the wired connector, the connector defining a set of terminal portions for seating the set of wires, respectively, fixing the connector with and in a receptacle of a latching system of an assembly station of an assembly system, wherein the latching system is attached to a base member of the assembly station, according to a set of visual instructions each comprising a set of light outputs and being sequentially output by a guide system of the assembly system instructing the user how to properly seat the set of wires in the set of terminal portions of the connector, performing, by the user, a set of push-click-tug procedures each comprising (i) observing for a first light output of a current visual instruction of the set of visual instructions for a current push-click-tug procedure, the first light output indicating a target container of the set of containers and obtaining a target wire therefrom, (ii) after obtaining the target wire, observing for a second light output of the current visual instruction indicating a target terminal portion of the set of terminal portions and pushing the target wire into the target terminal portion, (iii) while pushing the target wire into the target terminal portion, observing for a click indication and, after observing the click indication, tugging on the target wire to cause a pulling force on the connector that is sensed by a sensor system of the assembly station and monitored by a controller of the assembly station, and (iv) while tugging on the target wire, observing for a third light output of the current visual instruction indicating that the pulling force has satisfied a threshold indicative of a proper wire-terminal portion seating and, in response to observing the third light output, stopping tugging on the target wire to complete the current push-click-tug procedure associated with the current visual instruction, and upon properly completing the set of push-click-tug procedures, freeing the connector from the latching system to obtain the wired connector.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

As discussed above, a large number of wired connectors assembled using conventional assembly systems and methods do not pass testing, leading to decreased first time quality (FTQ) metrics and increased costs to fix improperly assembled wired connectors. This improper assembly typically involves one or more wires of the wired connector not being properly seated in a corresponding terminal portion of the connector. Thus, while these conventional assembly systems and methods work well for their intended purpose, an opportunity exists for improvement in the relevant art. Accordingly, improved wired connector assembly systems and methods are presented herein. These systems and methods assist an assembler in the proper assembly of a wired connector comprising a set of wires seated in a set of respective terminal portions of a connector. These improved wired connector assembly systems and methods provide for the instruction and verification of proper wire-terminal portion seating, thereby increasing FTQ metrics and decreasing costs to fix improperly assembled wired connectors. In addition, less extensive training/knowledge by human assemblers is required, which could further decrease costs and provide for more task flexibility at an assembly plant or facility.

Figure 1:
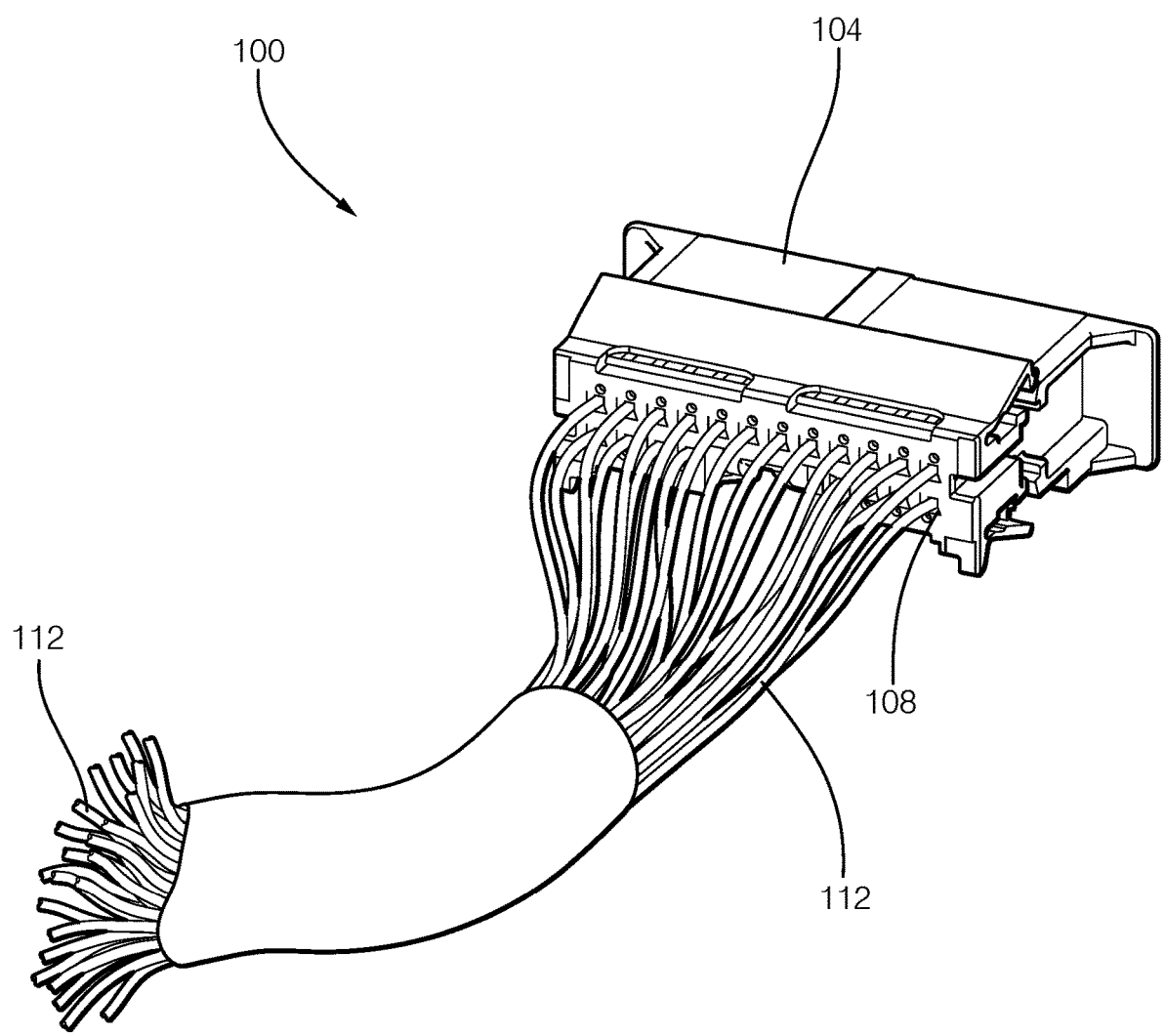
FIG. 1 illustrates a view of an example wired connector assembled using the assembly systems or methods according to some implementations of the present disclosure.

Referring now to FIG. 1, a view of an example wired connector 100 assembled using the assembly systems or methods according to some implementations of the present disclosure is illustrated. As shown, the wired connector 100 comprises a connector 104 (also known as a connector header, wire housing, or terminal) that defines a plurality of terminal portions 108 in which a plurality of respective wires 112 are seated. Each terminal portion 108, for example, could be a cavity defined in the connector 104 and having a metallic or other conductive seating element disposed therein. The plurality of wires 112 could also be electrically connected at their opposing ends to another connector/device/system (not shown). While many wired connectors include a plurality of wires 112 seated in a plurality of respective terminal portions 108, it will be appreciated that in some implementations the wired connector 100 could comprise a single wire 112 seated in a single respective terminal portion 108. Thus, these components will now be referred to herein as a set of terminal portions 108 (i.e., one or more terminal portions) and a set of wires 112 (i.e., one or more wires). As discussed above, one well-known procedure for performing a proper wire-terminal portion seating is the "push-click-tug" procedure where a wire is "pushed" into the respective terminal portion until a "click" indication is observed (a sound, a vibration, etc.) and the seating is then tested and verified by a "tug" on the wire, which will be discussed in greater detail below.

Figure 2:
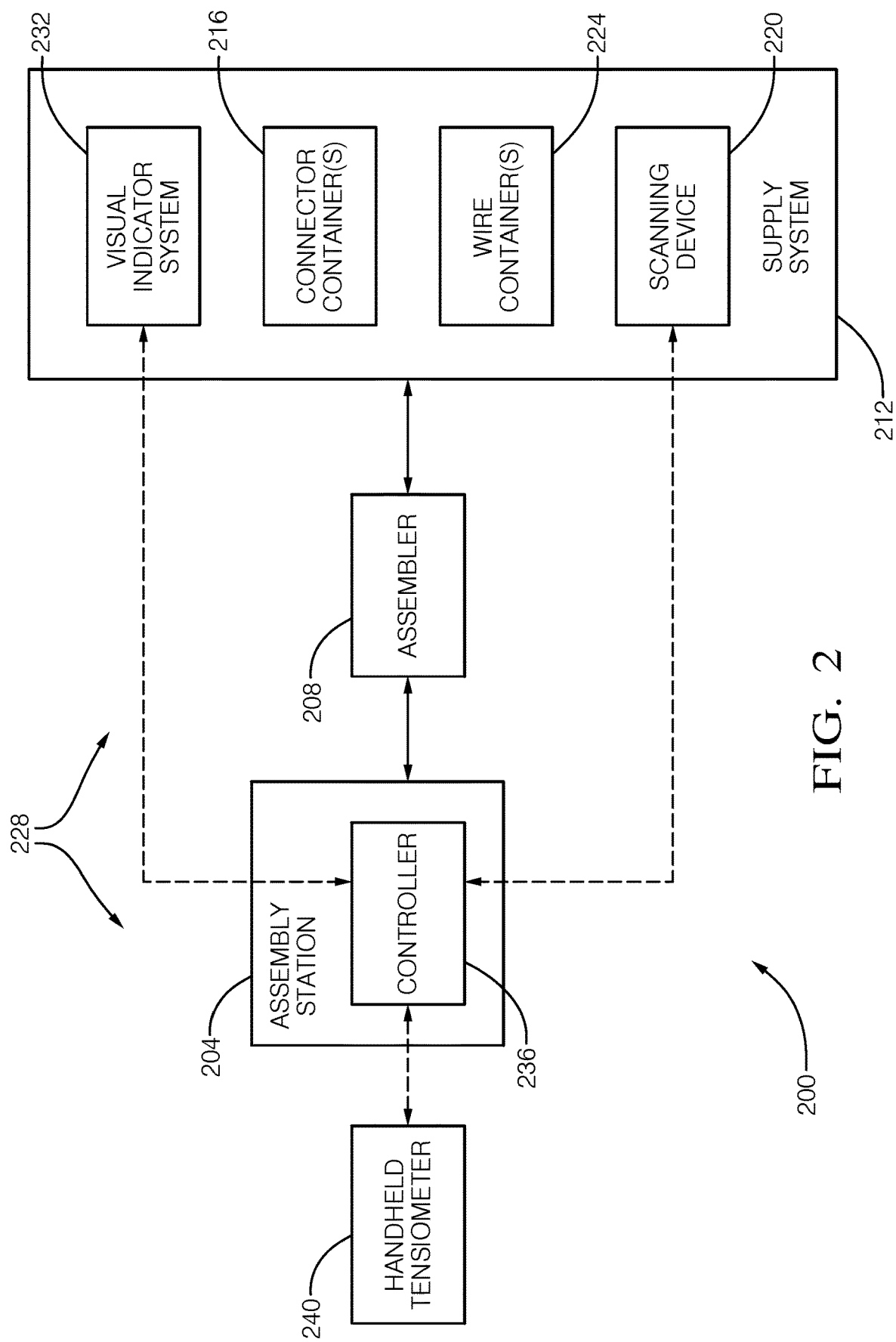
FIG. 2 illustrates functional block diagram of an example wired connector assembly system according to some implementations of the present disclosure.

Referring now to FIG. 2, a functional block diagram of an example wired connector assembly system 200 according to some implementations of the present disclosure is illustrated. The assembly system 200 comprises an assembly sub-system or station 204 that is utilized by an assembler 208 in the assembly of a wired connector, such as wired connector 100. It will be appreciated that the term "station" as used herein refers to a device/unit or system of devices/units that are separate from other components (i.e., a sub-system) of the larger assembly system 200 illustrated in FIG. 2 and described below. While the components of wired connector 100 will be referred to herein for illustration/reference, it will also be appreciated that the assembly system 200 could be utilized to assembly any suitable wired connector. It will further be appreciated that the term "assembler" as used herein could refer to a human operator/user as well as an automated assembler system, such as a robotic assembler or robotic assembly system. The assembler 208 utilizes the assembly station 204 and a set of instructions output therefrom to properly seat the set of wires 112 in the respective set of terminal portions 108 of the connector 104. Depending on the type of the assembler 208, this set of instructions could be audible, visual, and/or haptic instructions, or could be computer-executable instructions (e.g., a software routine). The connector 104 is retrieved by the assembler 208 from a set of connector containers 216 of a supply system 212. Each connector container 216, for example, could store a different type of connectors. The connector 104 is scanned or otherwise identified by a scanning device 220 of the supply system 212. While shown as a separate device, it will be appreciated that the scanning device 220 could be integrated into the assembly station 204. By scanning and identifying the type of the connector 104, the assembly station 204 can identify and obtain a proper set of instructions for assembling the wired connector 100.

Upon identifying and retrieving the connector 104, the assembler 208 then fixes the connector 104 within the assembly station 204. This fixing of the connector 104 within the assembly station 204, for example, could trigger or initiate the output of a set of instructions for the assembler 208 as to how to properly seat the set of wires 112 within the respective set of terminal portions 108. According to this set of instructions, the assembler 208 then retrieves the set of wires 112 from identified container(s) of a set of wire containers 224 of the supply system 212. Each wire container 224, for example, could store one or more different types of wires. In one implementation, a guide system 228 outputs the set of instructions. Some portions of this guide system 228 could be integrated into the assembly station 204 (described in greater detail below) and other portions of the guide system 228, such as a visual indicator system 232, could be separate or distinct from the assembly station 204, such as part of the supply system 212 as illustrated (e.g., in or proximate to the sets of containers 216, 224). The visual indicator system 232 is configured to output a set of visual instructions (e.g., light outputs) that instruct the assembler 208 as to which container 216, 224 to retrieve the connector 104 and/or the set of wires 112 from. It will be appreciated that the visual indicator system 232 could only provide visual indicators relative to the wire containers 224 as the connector 104 could be selected by the assembler 208 and then scanned by the scanning device 220 to initiate the assembly process. In one example implementation, the visual indicator system 232 comprises a set of lights, such as one light or set of lights per container 216, 224. It will also be appreciated that different types of light outputs could be generated, such as a flashing light output until a particular action is completed. The outputting of the set of instructions could be controlled by a controller 236 (e.g., a programmable logic controller, or PLC) of the assembly station 204, which could also verify the proper seating of the set of wires 112 in the respective terminal portions 108, such as based on measured pull force and one or more pull force thresholds, which could be calibrated at the controller 236 using a handheld tensiometer 240 or other suitable device/system.

Figure 3A:
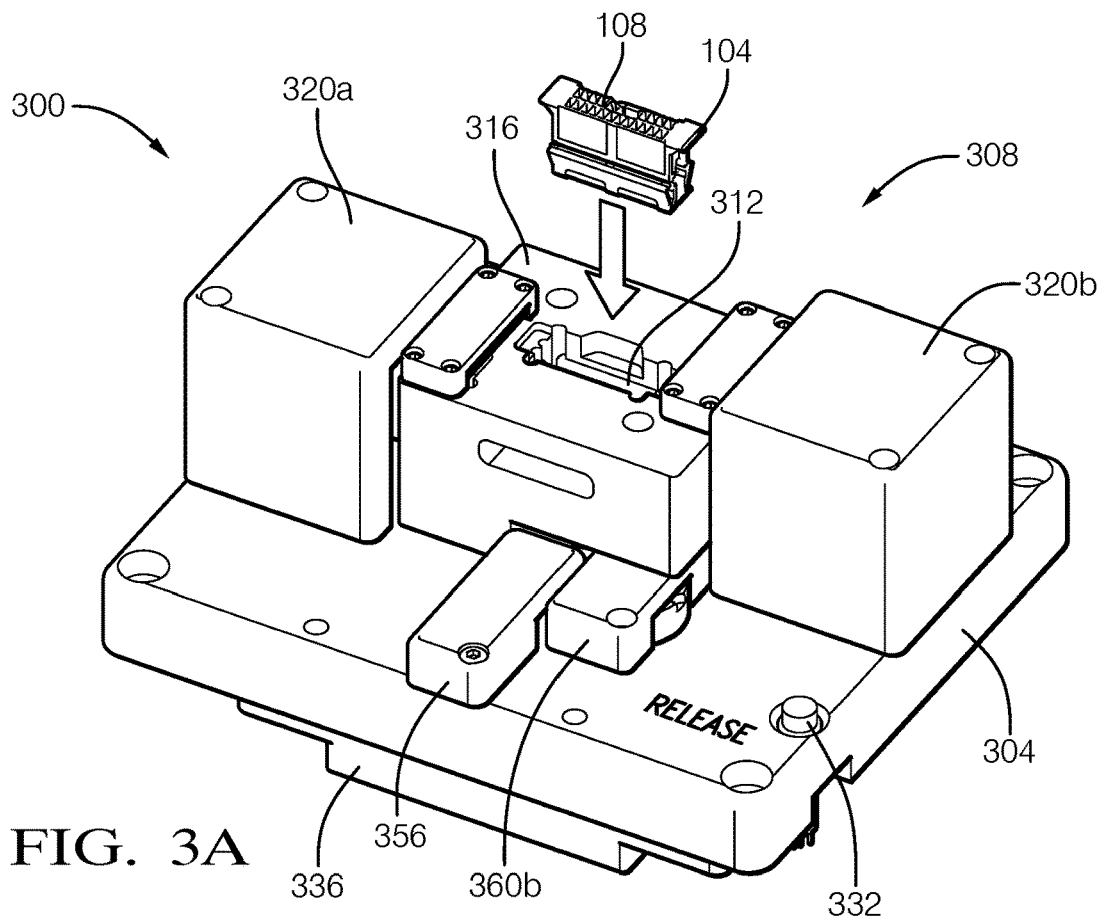
FIGS. 3A-3B illustrate views of an example configuration of a wired connector assembly station of the wired connector assembly system of FIG. 2 according to some implementations of the present disclosure.
Figure 3B:
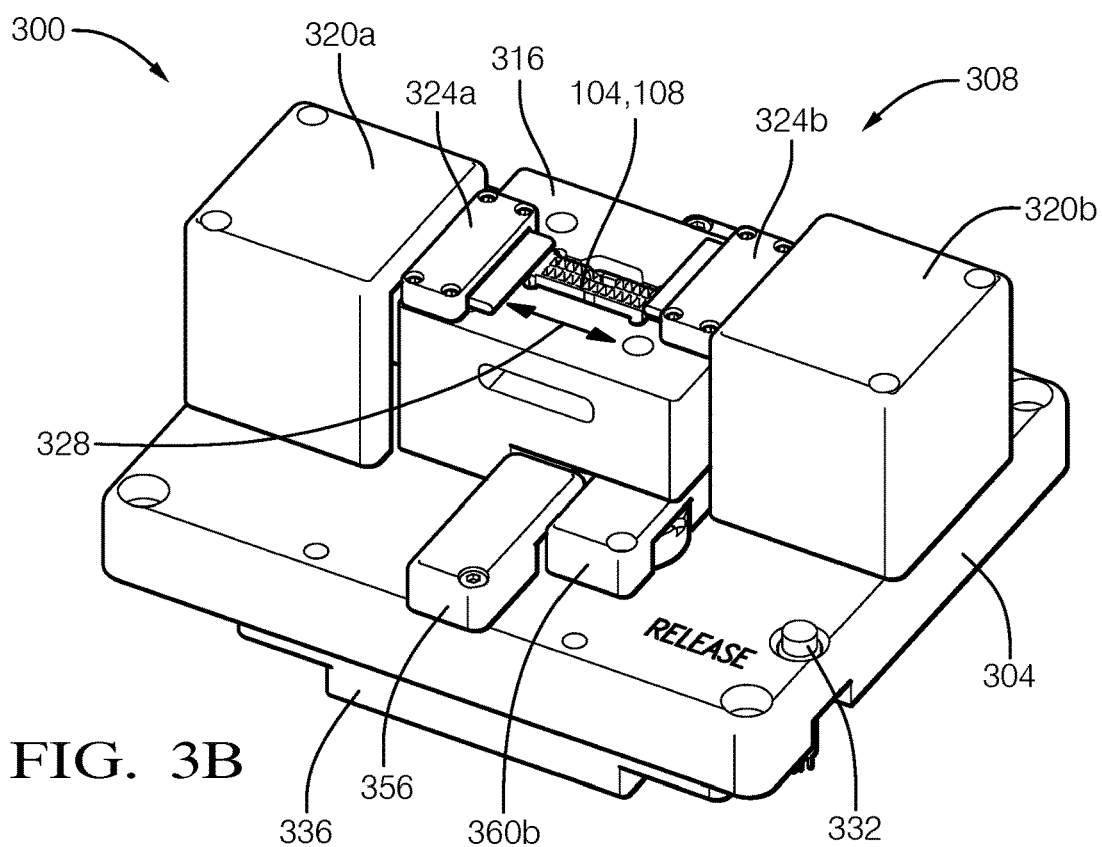
Figure 4A:
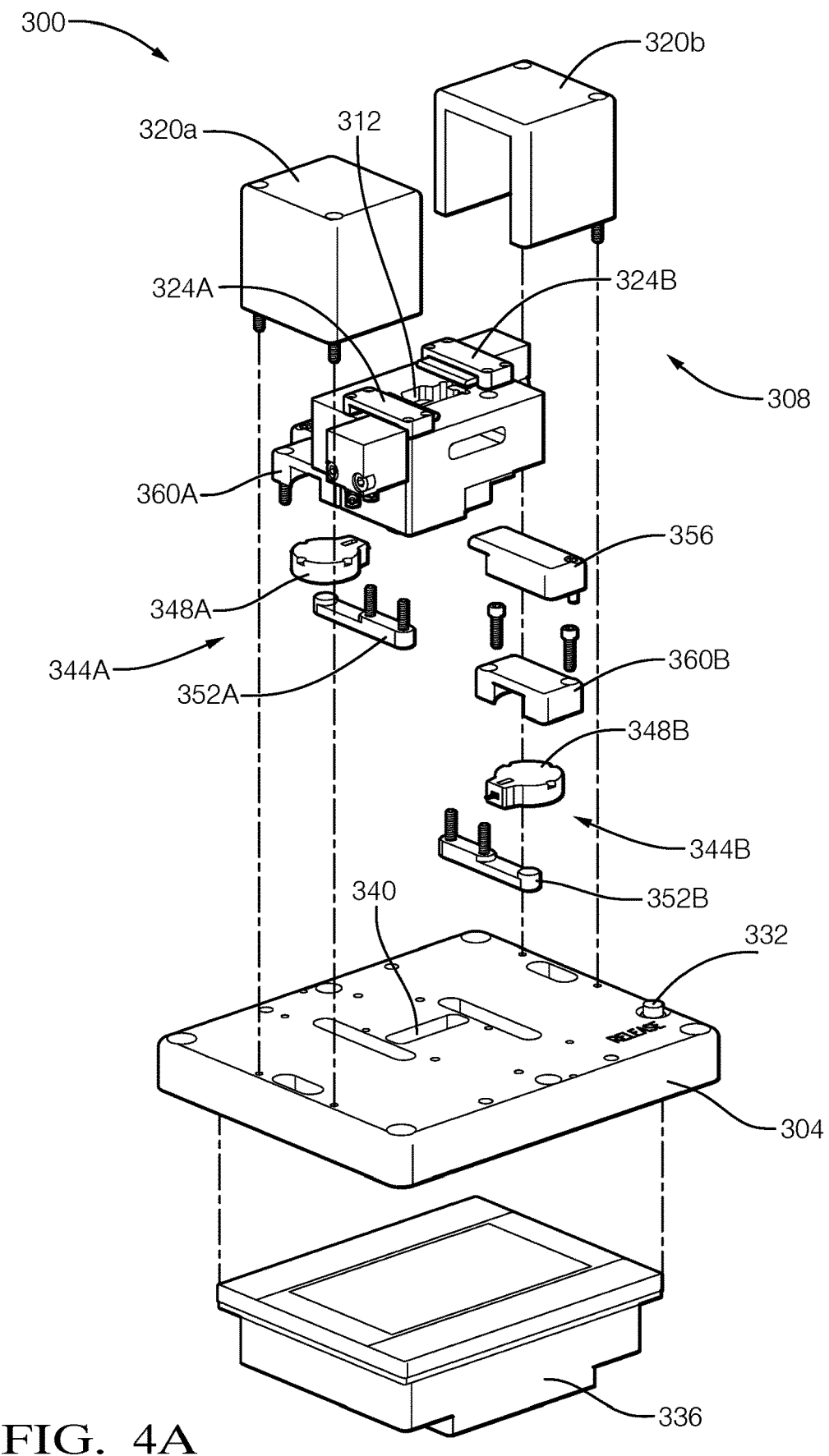
FIGS. 4A-4B illustrate exploded views of the example configuration of the wired connector assembly station of FIGS. 3A-3B according to some implementations of the present disclosure.
Figure 4B:
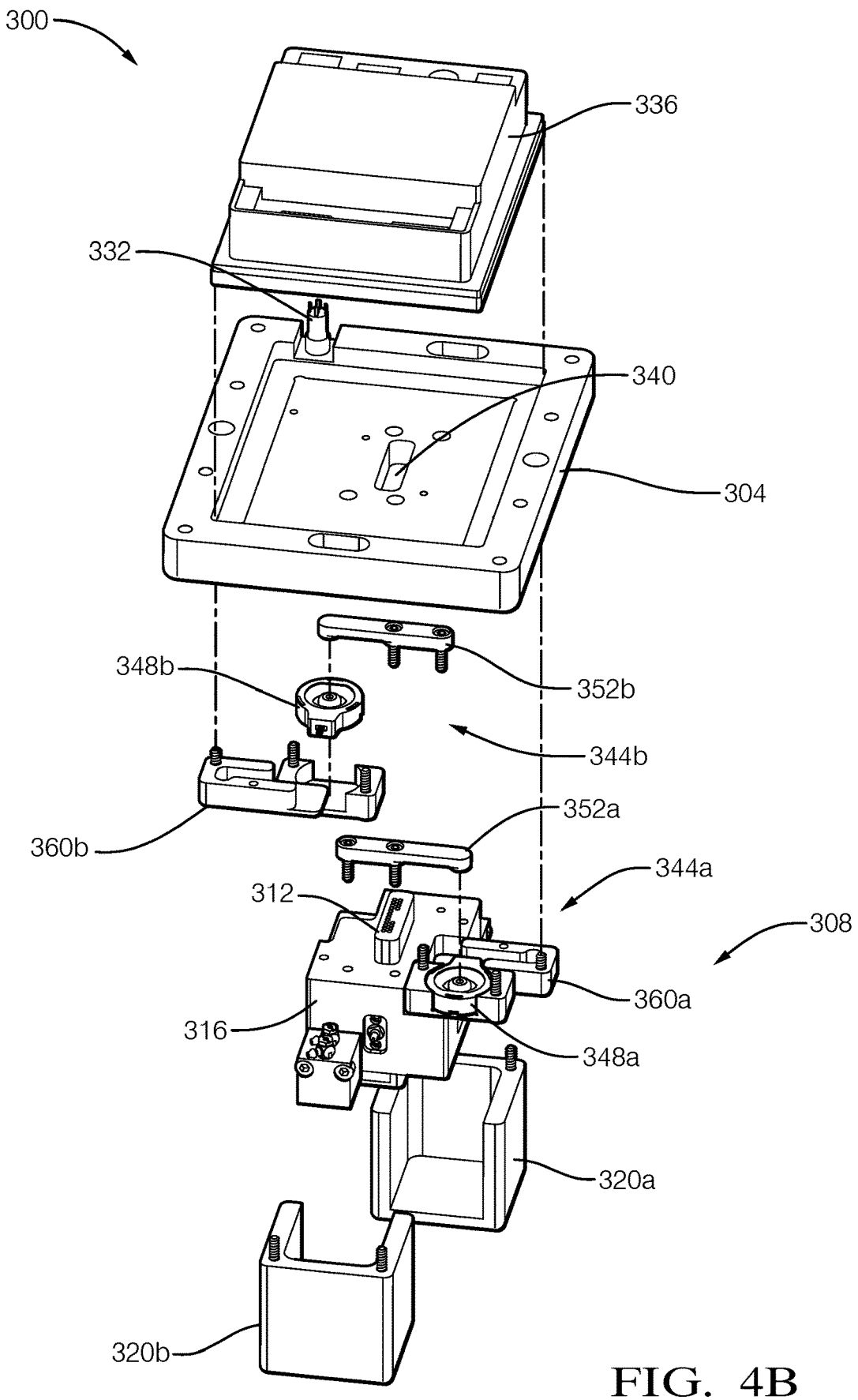

Referring now to FIGS. 3A-3B and 4A-4B and with continued reference to FIG. 2, an example configuration 300 of the assembly station 204 of the assembly system 200 is illustrated. This will be hereinafter referred to as assembly station 300. FIGS. 3A-3B illustrate the fixing of the connector 104 within the assembly station 300 and FIGS. 4A-4B illustrate exploded views of the assembly station 300. The assembly station 300 comprises a base member 304 that has a latching system 308 attached thereto. In one exemplary implementation as shown, the latching system 308 is a pneumatic latching system that comprises a receptacle 312 defined in a central member 316. The receptacle 312 is defined to receive the connector 104 as well as other types of connectors. In this pneumatic latching configuration, the latching system 308 further comprises latching members 324a, 324b that move inwardly and outwardly (between closed and open positions) from respective end members 320a, 320b and along an axis of movement 328. In the closed position, the latching members 324a, 324b fixably contact the connector 104 to secure it therein, whereas in the open position the latching members 324a, 324b do not contact the connector 104 thereby freeing or releasing it from the receptacle 312. The latching system 308 could be electronically controlled by the controller 236 and, in some implementations, could also be mechanically controlled via a manual release switch 332 and a manual release control lever 356. On an opposing side of the base member 304, a display device 336 is attached. The display device 336 could be, for example only, a human-machine interface (HMI) display that is configured to output visual instructions to the assembler 208, through a hole or opening 340 defined in the base member 304 and aligned with the display device 336, as to which terminal portions 108 to seat which wires 112.

Also attached to the base member 304 area pair of force or load sensors 344a, 344b. In one exemplary implementation as shown, the pair of load sensors 344a, 344b (also referred to herein collectively as "a sensor system" or "sensor system 344") are arranged proximate to diagonally opposing corners of the opening 340 to thereby provide for a more even or uniform pull force sensing on the base member 304 via the fixed connector 104. While a single pair of force or load sensors 344a, 344b are shown, it will be appreciated that other quantities of load sensors could be implemented. For example only, there could be two separate pairs of load sensors, with the load sensors in each pair of load sensors being arranged in series. In one exemplary implementation, the load sensors 344a, 344b comprise load cells 348a, 348b and load cell compressive bars 352a, 352b, respectively. In some implementations, the load cells 348a, 348b and load cell compressive bars 352a, 352b are covered or held together by load sensor cover members 360a, 360b in load sensor receptacles 364a, 364b, respectively. While a load cell/bar type configuration is specifically described and illustrated herein, it will be appreciated that any suitable type of pull force sensor could be utilized (mechanical strain gauge, piezoelectric strain gauge, etc.). As previously discussed herein, the pull force threshold(s) utilized by the assembly station 300 (i.e., by the controller 236) could be calibrated for each specific application, such as by using the handheld tensiometer 240. In one exemplary implementation, different pull force thresholds are utilized for proper wire-terminal portion seating verification and for emergency release of the connector 104 to prevent potential damage. It will also be appreciated that the specific configuration of the assembly station 300 shown in FIGS. 3A-3B and 4A-4B is merely one example configuration and there could be many other suitable configurations for the assembly station 204.

Figure 5:
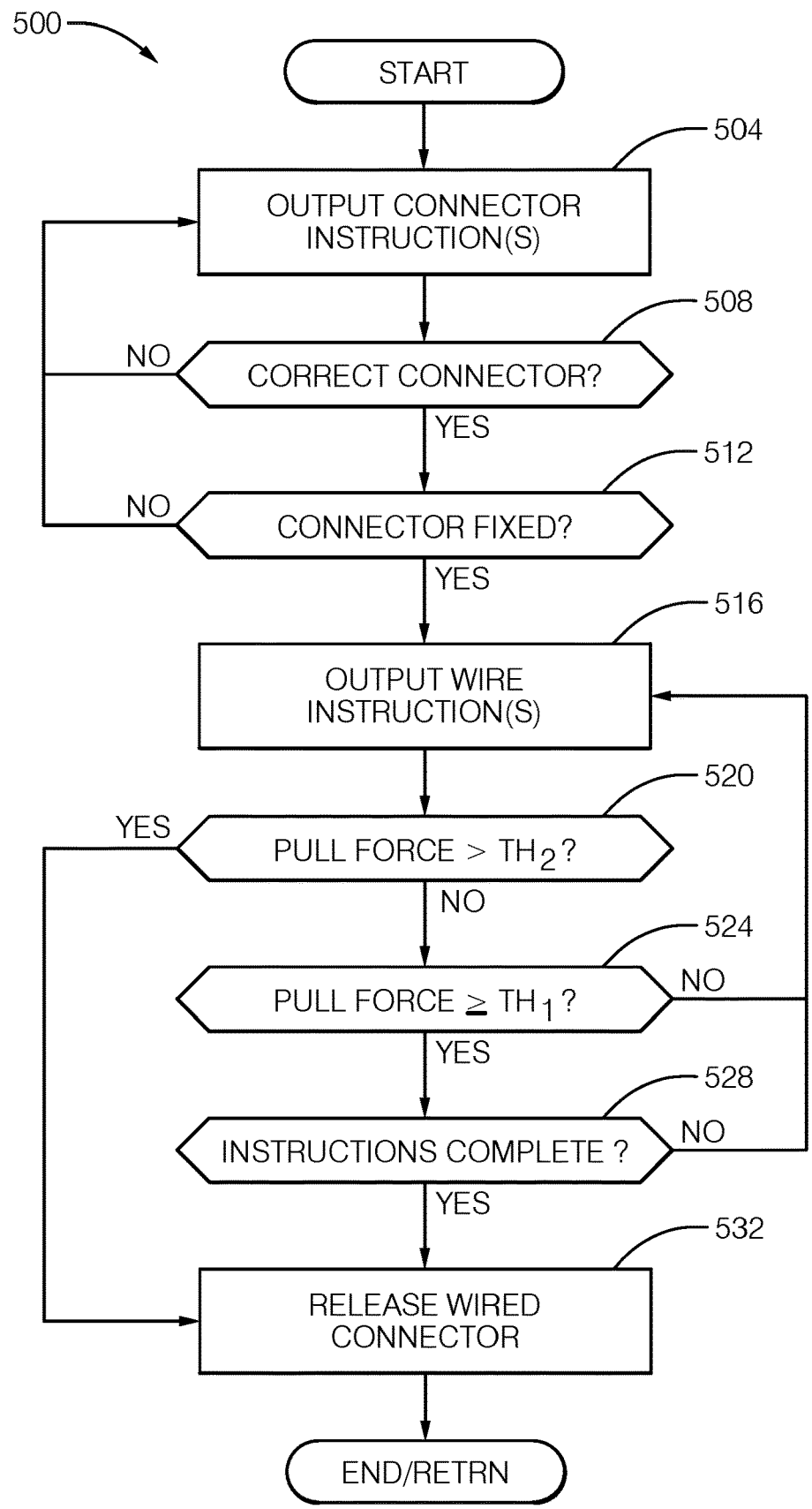
FIG. 5 illustrates a flow diagram of an example method of using the wired connector assembly station of FIGS. 3A-3B and 4A-4B to assemble a wired connector according to some implementations of the present disclosure.

Referring now to FIG. 5 and with continued reference to FIGS. 2, 3A-3B, and 4A-4B, a flow diagram of an example wired connector assembly method 500 of using the assembly station 300 of FIGS. 3A-3B and 4A-4B according to some implementations of the present disclosure is illustrated. At 504, the controller 236 outputs a set of connector instructions. This could include, for example, commanding the guide system 228 (e.g., the visual indicator system 232) to identify a particular connector container 216 having the target connector 104. At 508, the controller 236 determines whether the target connector 104 has been obtained, e.g., using the scanning device 220. When true, the method 500 proceeds to 512. Otherwise, the method 500 returns to 504. At 512, the controller 236 determines whether the connector 104 is fixed by and within the receptacle 312 of the latching system 308. When true, the method 500 proceeds to 516. Otherwise, the method 500 returns to 504. At 516, the controller 236 commands the guide system 228 to sequentially output a set of instructions instructing the assembler 208 how to properly seat the set of wires 112 in the set of terminal portions 108 of the connector 104. In one exemplary implementation, each instruction comprises one or more visual instructions (i.e., a respective set of visual outputs), such as a visual (e.g., light) output by the visual indicator system 232 as to which wire container 224 that the assembler 208 is to retrieve the target wires 112 from and another visual (e.g., light) output by the display device 336 as to which target terminal portion 108 that the assembler 208 is to seat each target wire 112.

At 520, the controller 236 determines whether the sensed pulling force (e.g., as measured by load sensors 344a, 344b) satisfies a second threshold ($TH_2$). This second threshold $TH_2$ is indicative of a pulling force that could potentially damage the connector 104. When this second threshold $TH_2$ is satisfied at 520, the method 500 proceeds to 532 where the controller 236 commands the latching system 308 to the open position to release the connector 104. Otherwise, the method 500 continues to 524. At 524, the controller 236 determines whether the sensed pulling force (e.g., as measured by load sensors 344a, 344b) satisfies a lesser first threshold ($TH_1$). This first threshold $TH_1$ is indicative of a proper wire-terminal portion seating. When this first threshold $TH_1$ is satisfied, the method 500 proceeds to 528. Otherwise, the method returns to 516. At 528, the controller 236 determines whether the set of instructions have completed. The completion of the set of instructions is also indicative of the verification of the proper wire-terminal portion seating for each of the set of wires 112 in the respective set of terminal portions 108. When false, the method 500 returns to 516. When true, however, the method 500 proceeds to 532 where the controller 236 or the assembler 208 (e.g., via manual release switch 332) commands or controls the latching system 308 to the open position to release the fully assembled wired connector 100. The method 500 then ends or returns to 504 for another assembly cycle.

Figure 6:
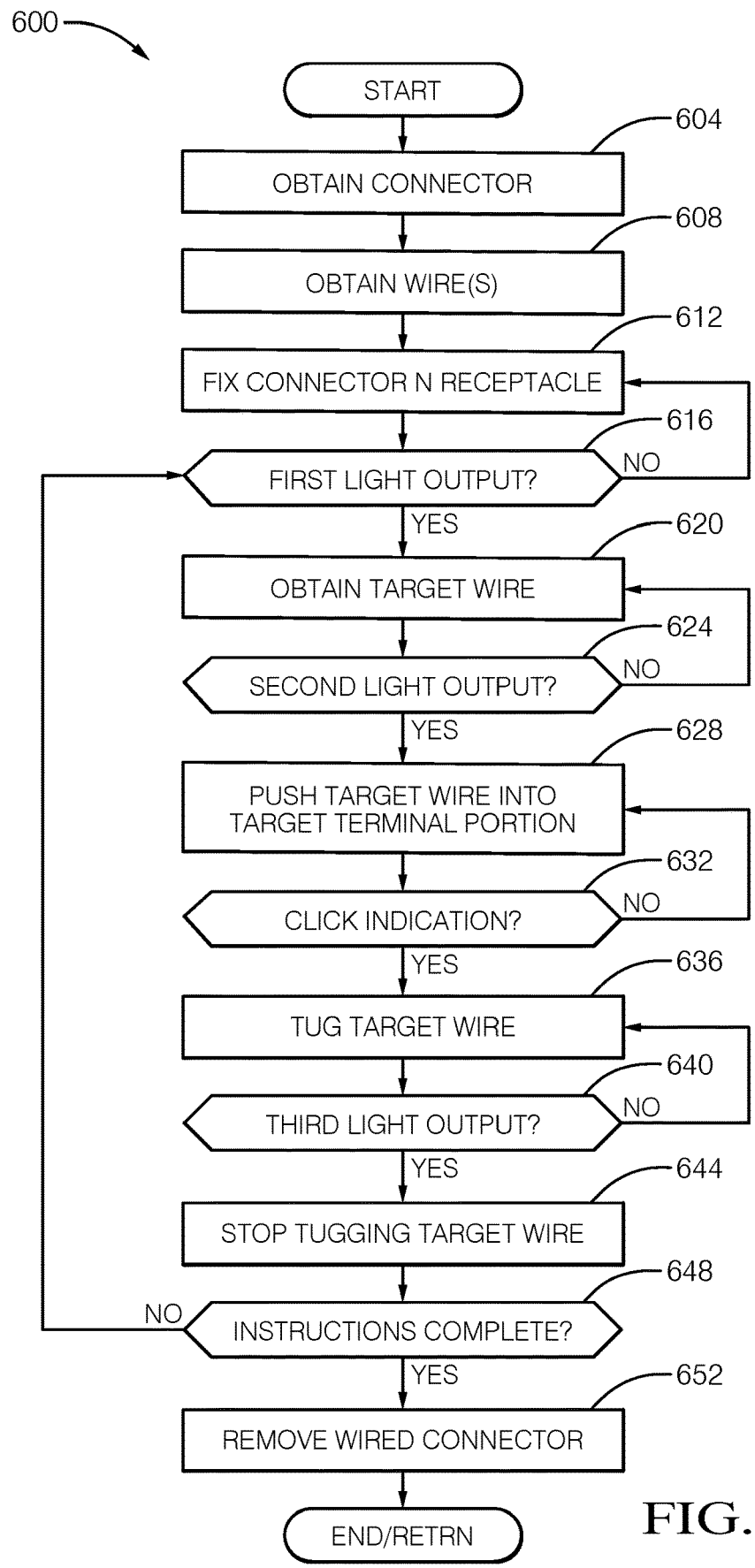
FIG. 6 illustrates a flow diagram of an example method of a user using the wired connector assembly system of FIG. 2 to assemble a wired connector including a set of push-click-tug procedures according to some implementations of the present disclosure.

Referring now to FIG. 6 and with continued reference to FIG. 2, a flow diagram of another example wired connector assembly method 600 using the assembly system 200 of FIG. 2 including a set of push-click-tug procedures according to some implementations of the present disclosure is illustrated. At 604, the assembler 208 obtains the target connector 104 (e.g., from a target connector container 216 as identified by the guide system 228). At 608, the assembler 208 obtains the target set of wires 112 (e.g., from target wire container(s) 224 as identified by the guide system 228). It will be appreciated that the set of wires 112 could be sequentially obtained during the output of the set of instructions and not initially obtained all at once. At 612, the assembler 208 fixes the connector 104 in the assembly station 204 of assembly system 200. At 616, the assembler 208 observes for a first light output by the guide system 228 that is indicative of a target wire 112 for a current push-click-tug procedure and could be initiated in response to the connector 104 being properly fixed in the assembly station 204. When the first light output is observed by the assembler 208, the method 600 proceeds to 620. Otherwise, the method returns to 612.

At 620, the assembler 208 obtains the target wire 112 as instructed by the first light output. At 624, the assembler 208 observes for a second light output that is indicative of a target terminal portion 108 in which the assembler 208 is to seat the target wire 112. When the second light output is observed by the assembler 208, the method 600 proceeds to 628. Otherwise, the method 600 returns to 620. At 628, the assembler 208 inserts and pushes the target wire 112 into the target terminal portion 108 of the connector 104. At 632, the assembler 632 observes for a click indication. As previously described herein, this click indication could be an audible response (e.g., a click sound) and/or a haptic response (e.g., a vibration). When the click indication is observed by the assembler 208, the method 600 proceeds to 636. Otherwise, the method 600 returns to 628. At 636, the assembler 208 tugs or pulls on the target wire 112, which causes a pulling force on the connector 104 that is measured/monitored by the controller 236 of the assembly station 204. At 640, the assembler 208 observes for a third light output that is indicative of the pulling force satisfying a threshold indicative of a proper wire-terminal portion seating. When the third light output is observed by the assembler 208, the method 600 proceeds to 644 where the assembler 208 ceases tugging or pulling on the target wire 112 as it is properly seated. Otherwise, the method 600 returns to 636. At 648, the assembler 208 or the controller 236 determines whether the set of instructions corresponding to the set of push-click-tug procedures have completed. When true, the method 600 proceeds to 652. Otherwise, the method 600 returns to 616 where the instructions and the push-click-tug procedures continued. At 652, the assembler 208 or the controller 236 releases the connector 104 from the assembly station 204 to thereby obtain the fully assembled wired connector 100. The method 600 then ends or returns to 604 for another assembly cycle.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An assembly station of an assembly system for assisting an assembler in the assembly of a connector and a set of wires seated in a set of terminal portions of the connector, respectively, the assembly station comprising:
   a base member;
   a latching system attached to the base member, defining a receptacle, and being configured to move between a closed position in which the connector is fixed within the receptacle and an open position in which the connector is removable from the receptacle;
   a sensor system attached to the base member and being configured to sense a pulling force on the connector while fixed within the receptacle of the latching system;
   at least a portion of a guide system configured to output instructions; and
   a controller configured to:
      command the guide system to sequentially output a set of instructions instructing the assembler how to properly seat the set of wires in the set of terminal portions of the connector;
      during the output of each particular instruction of the set of instructions, monitor, using the sensor system, the sensed pulling force on the connector; and
      in response to the sensed pulling force satisfying a first threshold indicative of a proper wire-terminal portion seating, command the guide system to complete the output of the particular instruction and to then sequentially output any remaining instructions of the set of instructions until the output of a final instruction is complete, including the sensed pulling force again satisfying the first threshold, and a wired connector is thereby obtained.

2. The assembly system of claim 1, wherein the controller is configured to, in response to the sensed pulling force exceeding a greater second threshold indicative of a pulling force that could damage the connector, command the latching system to the open position thereby freeing the connector from the receptacle.

3. The assembly system of claim 2, wherein each instruction of the set of instructions comprises a respective set of visual outputs, and wherein each visual output of the respective set of visual outputs identifies either a particular wire of the set of wires or a particular terminal portion of the connector in which the assembler is to seat the particular wire.

4. The assembly system of claim 3, wherein the base member defines an opening aligned with the receptacle, wherein the guide system comprises a display device attached to a first side of the base member that opposes a second side of the base member where the latching system and the sensing system are attached, and wherein the display device is aligned with the opening.

5. The assembly system of claim 4, wherein the display device is configured to output at least some of each respective set of visual outputs through the opening defined by the base member to thereby identify the particular terminal portion of the connector in which the assembler is to seat the particular wire.

6. The assembly system of claim 5, wherein the guide system further comprises a visual indicator system that is distinct from the assembly station and its display device and that is configured to output at least some of each respective set of visual outputs proximate to a particular container of a set of respective containers that store the set of wires to identify the particular container from which the assembler is to retrieve the particular wire.

7. The assembly system of claim 1, wherein the latching system is a pneumatically-actuated latch comprising two latching members each movable along an axis and being configured to move inwardly along the axis to fixably contact the connector in the closed position and to move outwardly along the axis to not contact the connector in the open position.

8. The assembly system of claim 1, wherein the sensor system comprises at least one pair of force sensors attached to the base member, wherein a first force sensor of each pair of force sensors is attached to the base member proximate to a diagonally opposing corner of the receptacle relative to a second force sensor of the pair of force sensors.

9. The assembly system of claim 1, wherein the assembly station further comprises a manual release switch that, when actuated, moves the latching system to the open position.

10. The assembly system of claim 1, wherein the controller is a programmable logic controller (PLC) and the first and second thresholds are calibratable during a calibration process that utilizes an external handheld tensiometer.

11. An assembly method using an assembly station of an assembly system to assist an assembler in assembling a connector and a set of wires seated in a set of terminal portions of the connector, respectively, the assembly method comprising:
  detecting, by a controller of the assembly station, that the connector is fixed by and within a receptacle defined by a latching system of the assembly station, wherein the latching system is attached to a base member of the assembly station and is configured to move between a closed position in which the connector is fixed within the receptacle and an open position in which the connector is removable from the receptacle;
  in response to detecting that the connector is fixed within the receptacle, commanding, by the controller, a guide system of the assembly system to sequentially output a set of instructions instructing the assembler how to properly seat the set of wires in the set of terminal portions of the connector;
  during the output of each particular instruction of the set of instructions, monitoring, by the controller and using a sensor system of the assembly station, a sensed pulling force on the connector, wherein the sensor system is also attached to the base member; and
  in response to the sensed pulling force satisfying a first threshold indicative of a proper wire-terminal portion seating, commanding, by the controller, the guide system to complete the output of the particular instruction and to then sequentially output any remaining instructions of the set of instructions until the output of a final instruction is complete, including the sensed pulling force again satisfying the first threshold, and a wired connector is thereby obtained.

12. The assembly method of claim 11, further comprising in response to the sensed pulling force exceeding a greater second threshold indicative of a pulling force that could damage the connector, commanding, by the controller, the latching system to the open position thereby freeing the connector from the receptacle.

13. The assembly method of claim 12, wherein each visual instruction of the set of visual instructions comprises a respective set of visual outputs, and wherein each visual output of the respective set of visual outputs identifies either a particular wire of the set of wires or a particular terminal portion of the connector in which the assembler is to seat the particular wire.

14. The assembly method of claim 13, wherein the base member defines an opening aligned with the receptacle, wherein the guide system comprises a display device attached to a first side of the base member that opposes a second side of the base member where the latching system and the sensing system are attached, and wherein the display device is aligned with the opening.

15. The assembly method of claim 14, wherein the display device is configured to output at least some of each respective set of visual outputs through the opening defined by the base member to thereby identify the particular terminal portion of the connector in which the assembler is to seat the particular wire.

16. The assembly method of claim 15, wherein the guide system further comprises a visual indicator system that is distinct from the assembly station and its display device and that is configured to output at least some of each respective set of visual outputs proximate to a particular container of a set of respective containers that store the set of wires to identify the particular container from which the assembler is to retrieve the particular wire.

17. The assembly method of claim 11, wherein the latching system is a pneumatically-actuated latch comprising two latching members each movable along an axis and being configured to move inwardly along the axis to fixably contact the connector in the closed position and to move outwardly along the axis to not contact the connector in the open position, and wherein the assembly station further comprises a manual release switch that, when actuated, moves the latching system to the open position.

18. The assembly method of claim 11, wherein the sensor system comprises at least one pair of force sensors attached to the base member, wherein a first force sensor of each pair of force sensors is attached to the base member proximate to a diagonally opposing corner of the receptacle relative to a second force sensor of the pair of force sensors.

19. The assembly method of claim 11, wherein the controller is a programmable logic controller (PLC) and the method further comprises calibrating, by the controller, the first and second thresholds are during a calibration process that utilizes an external handheld tensiometer.

20. A method for a user to assemble a wired connector, the method comprising:
  obtaining a set of wires for the wired connector, each wire of the set of wires being stored in a respective container of a set of containers;
  obtaining a connector for the wired connector, the connector defining a set of terminal portions for seating the set of wires, respectively;
  fixing the connector with and in a receptacle of a latching system of an assembly station of an assembly system, wherein the latching system is attached to a base member of the assembly station;
  according to a set of visual instructions each comprising a set of light outputs and being sequentially output by a guide system of the assembly system instructing the user how to properly seat the set of wires in the set of terminal portions of the connector, performing, by the user, a set of push-click-tug procedures each comprising:
    (i) observing for a first light output of a current visual instruction of the set of visual instructions for a current push-click-tug procedure, the first light output indicating a target container of the set of containers and obtaining a target wire therefrom;
(ii) after obtaining the target wire, observing for a second light output of the current visual instruction indicating a target terminal portion of the set of terminal portions and pushing the target wire into the target terminal portion;
(iii) while pushing the target wire into the target terminal portion, observing for a click indication and, after observing the click indication, tugging on the target wire to cause a pulling force on the connector that is sensed by a sensor system of the assembly station and monitored by a controller of the assembly station; and
(iv) while tugging on the target wire, observing for a third light output of the current visual instruction indicating that the pulling force has satisfied a threshold indicative of a proper wire-terminal portion seating and, in response to observing the third light output, stopping tugging on the target wire to complete the current push-click-tug procedure associated with the current visual instruction; and upon properly completing the set of push-click-tug procedures, freeing the connector from the latching system to obtain the wired connector.

* * * * *